O. W. HANSON.
UNIVERSAL JOINT.
APPLICATION FILED DEC. 2, 1919.

1,384,255.

Patented July 12, 1921.
2 SHEETS—SHEET 1.

Inventor:
Oscar W. Hanson,

By C. C. Hines,
Attorney.

Witness

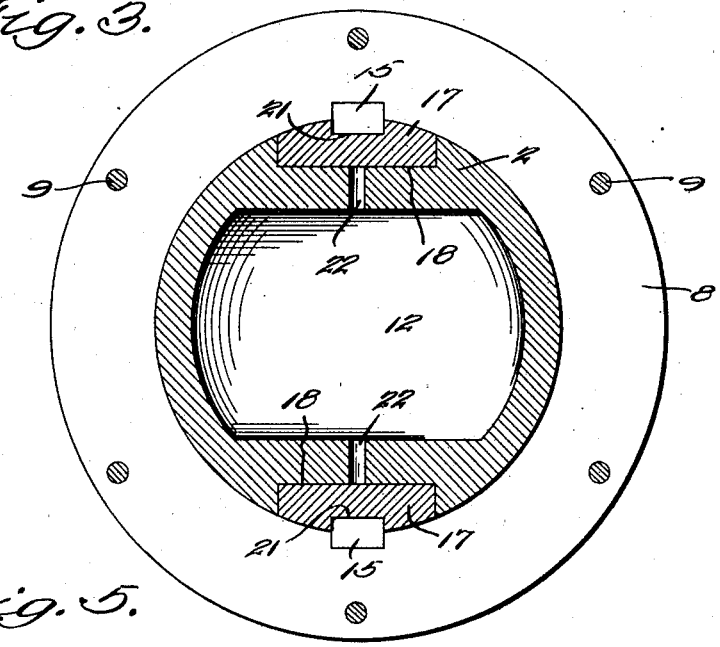
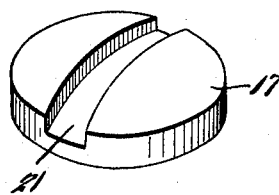
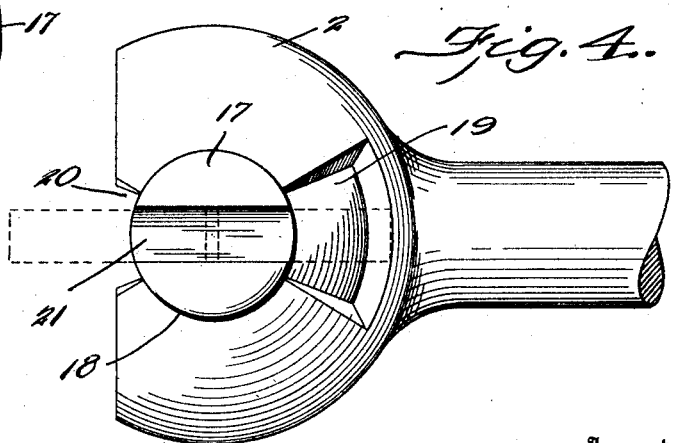

UNITED STATES PATENT OFFICE.

OSCAR W. HANSON, OF SALINA, KANSAS.

UNIVERSAL JOINT.

1,384,255.  Specification of Letters Patent.  Patented July 12, 1921.

Application filed December 2, 1919. Serial No. 342,001.

*To all whom it may concern:*

Be it known that I, OSCAR W. HANSON, a citizen of the United States, residing at Salina, in the county of Saline and State of Kansas, have invented new and useful Improvements in Universal Joints, of which the following is a specification.

This invention relates to universal joints for automobile and similar drive gearings, and one object of the invention is to provide a universal joint of simple construction which allows free and easy movement of the ball-member within the socket-member, while at the same time holding said members against relative rotation on their axes, and which further obviates the objectionable buckling or jerking movements common to devices of this character employing yoke-and-pin joints.

Another object of the invention is to provide a universal joint that affords an increased amount of wear surface, and thus increases the period of usefulness of the joint, which avoids lost motion and hence transmits full power from the driving element to the driven element, which embodies means for simple adjustment of the parts to compensate for wear, which embodies novel means for securing more reliable and efficient lubrication of the wear surfaces, and which is of a structure insuring economy of construction and ease and convenience in replacing worn parts.

The invention consists of the features of construction, combination and arrangement of parts, hereinafter fully described and claimed, reference being had to the accompanying drawings, in which:—

Fig. 3 is a vertical transverse section taken on a line centrally through the joint.

Fig. 4 is a plan view of the socket-member.

Fig. 5 is a perspective view of one of the oscillatory bearing disks.

Figure 1:
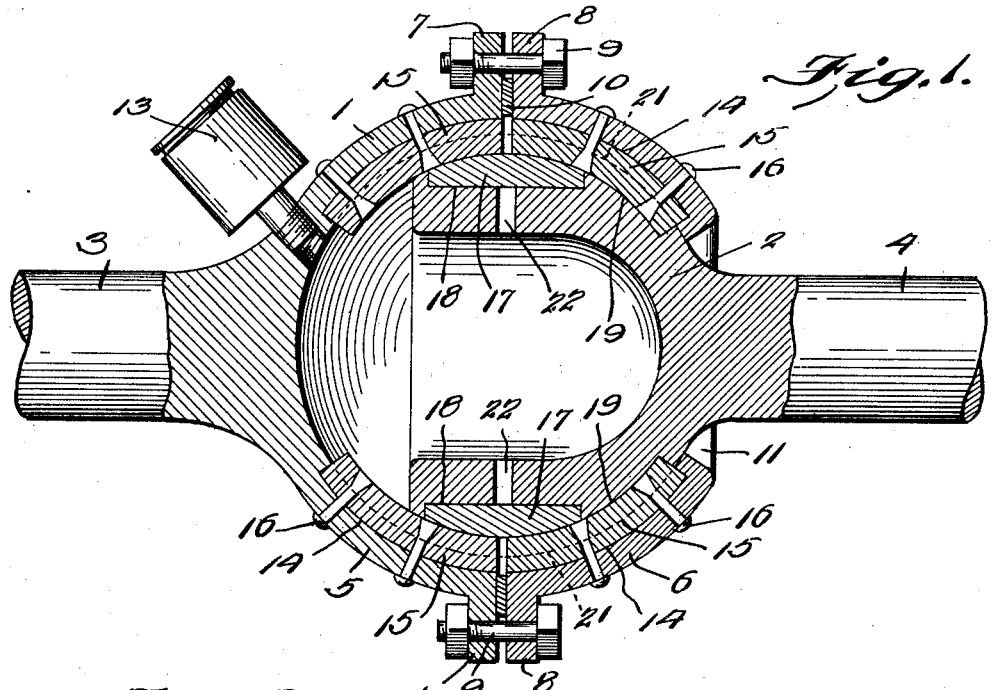
Figure 1 is a central vertical longitudinal section through the joint.
Figure 2:
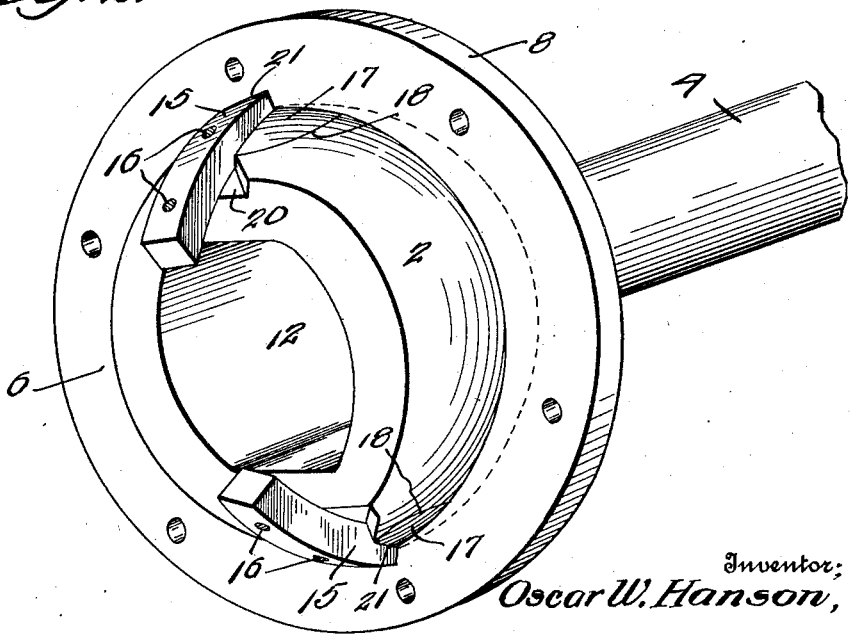
Fig. 2 is a perspective view of the ball-member, the cap section of the socket-member and certain parts carried by the ball-member.

In the practical embodiment of my invention, in the form now best known to me, I provide a universal joint comprising a socket member 1 and a ball member 2, said members being respectively carried by or provided with the shaft sections 3 and 4. The socket member 1 is of substantially spherical form and divided transversely, on a substantially medial line, to provide a fixed or body section 5 and an adjustable and removable section 6. These sections 5 and 6 have their meeting edges formed with flanges 7 and 8 perforated for the passage of securing bolts 9, whereby said sections are detachably and adjustably coupled together. Shims or washers 10 of different thicknesses may be interposed between the flanges 7 and 8 to prevent leakage of lubricant from the interior of the joint, the construction being such that as wear upon the friction surfaces of the joint occurs thinner shims may be inserted and the bolts 9 adjusted to take up the wear and thus prevent undue play or rattling of the parts.

The detachable section 6 of the socket member is provided at its side diametrically opposite the shaft 3 with a flaring opening 11 for the movement of the shaft 4 in the flexions of the joints, and, as shown, the ball member 2 comprises a substantially cup-shaped body open on its side facing the closed side of the socket member 1, said cup-shaped body providing a chamber 12 coöperating with a portion of the socket member to provide a reservoir for grease or other lubricant, whereby the working surfaces of the joint may at all times be kept sufficiently lubricated for a smooth action. Lubricant may be introduced into the hollow joint in any suitable manner, and if desired a lubricant supply cup 13 may be provided upon the socket member so that the store of lubricant within the joint may be replenished from time to time as required.

The sections of the socket member 1 are provided with segmentally curved recesses 14, arranged diametrically opposite each other and extending in a direction parallel with the shaft members 3 and 4, or in a direction parallel with the longitudinal axis of the joint. Fitted in these recesses are hard metal keys or guide bars 15, each key being of sectional construction, and the adjacent ends of the sections thereof alining with the inner faces of the flanges 7 and 8 to permit adjustment thereof and of the socket member sections 5 and 6 in an obvious manner. These keys are fixed to the socket member in any suitable manner, as by means of rivets 16, and project inwardly therefrom.

The ball member 2 is provided, for coöperation with the keys 15, with circular bearing disks 17, one for use in connection with each sectional key. These bearing disks are arranged diametrically opposite each other and fitted to oscillate in circular sockets 18 formed in the periphery of the cup-shaped body of the ball member. Also formed in the periphery of the ball member, and intersecting the outer and inner sides of each socket are segmental or flaring recesses 19 and 20 which receive the inwardly projecting portions of the sections of the adjacent key 15, which key sections also extend through a groove 21 formed in the outer face of the coöperating disk 17, which face of the disk is of convex form to correspond to the contour of the inner surface of the wall of the socket member.

By the construction described it will be seen that the key elements 15 engage the ball member and fix said members against rotation on their axes and against movement in any but one direction with respect to their axes, said keys slidably engaging the recesses and grooves in the ball member and bearing disks and thereby permitting the ball and socket members to have pivotal motion in such direction. Thus, assuming that the plane of section represented in Fig. 1 is vertical, it will be understood that the ball and socket members will be permitted to have articulating motion in a vertical plane through the sliding engagement of the sockets with the aforesaid recesses and grooves. At the same time it will be understood that the bearing disks 17 are free to oscillate in the sockets 18 and hence, through the medium of their engagement with the keys 15, the ball and socket members of the joint will be connected and permitted to have pivotal or articulating motion in a direction at right angles to the articulating motion first named, or in a direction horizontally or transversely of the longitudinal axis of the joint. Obviously the construction is such as to permit the two joint members to have free and easy relative movements, one within the other, in the deflections of the shaft sections 3 and 4 from a straight or normal line, without the objectionable angularities of motion and strains imposed upon the universal joints of the yoke-and-pin type. It will also be seen that the joint forming the subject-matter of this invention will transmit power without lost motion, provision being made for conveniently adjusting the parts to compensate for wear, and hence is more efficient in the transmission of power. Also by the construction described renewable wear surfaces are provided which are of much greater extent or capability for wear than universal joints of ordinary construction, with the result of securing greater endurance and freedom from wear and greater economy in final cost and a material saving in repairs, these advantages also arising in part from the smooth and easy motion of the joint elements.

In the operation of the joint the lubricant contained within the internal reservoir will be thrown outwardly by centrifugal force against the walls of the socket, thus causing the lubricant to be transmitted or spread to all portions of surfaces which are in bearing contact, thus securing reliable and efficient lubrication of the joint at all times when any quantity of lubricant is contained therein. Ports or passages 22 may be provided between the chamber 12 and sockets 18 for the purpose of transmitting lubricant to said sockets, whereby the bearing disk 17 will be kept thoroughly lubricated in an obvious manner.

Having thus fully described my invention, I claim:—

1. A universal joint comprising a ball member, a transversely divided socket member composed of detachably connected sections, the outer peripheral surface of said ball member and the inner peripheral surfaces of the sections of the socket member being provided with opposed sets of grooves in the plane of the longitudinal axis of the joint, sectional keys fitted in said grooves and secured to the socket member, and circular disks fitted to oscillate in said ball member to permit movement of said members in a plane transverse to the longitudinal axis of the joint, said disks having grooves slidably receiving said keys.

2. A universal joint comprising ball and socket members, said ball member having circular cavities and flaring grooves intersecting diametrically opposite sides thereof, circular disks fitted to oscillate in said cavities and having grooves therein, and keys on the socket member slidably engaging said grooves in the ball member and circular disks.

3. A universal joint comprising ball and socket members, said members being provided with opposed sets of grooves in the plane of the longitudinal axis of the joint, segmental keys fitted in said grooves, and circular disks fitted to oscillate in said ball member to permit movement of said members in a plane transverse to the longitudinal axis of the joint, said disks having grooves slidably receiving said keys.

4. A universal joint comprising a socket member having recesses therein in the plane of its longitudinal axis, a ball member having circular cavities and recesses at opposite sides of said cavities and alining with said recesses in the socket member, circular disks fitted to oscillate in said circular cavities and having grooves intersecting the same, and keys secured in the recesses in the socket member and slidably engaging said recesses in the ball member and the grooves in the circular disks.

5. A universal joint comprising a socket member having recesses therein in the plane of its longitudinal axis, a ball member comprising a hollow body in communication at its inner end with the socket member and having circular cavities and recesses at opposite sides of said cavities and alining with said recesses in the socket member, circular disks fitted to oscillate in said circular cavities and having grooves intersecting the same, and keys secured in the recesses in the socket member and slidably engaging said recess in the ball member and the grooves in the circular disks, the said ball member being provided with lubricant feed ports connecting the interior of its body with said circular cavities.

In testimony whereof I affix my signature.

OSCAR W. HANSON.